(12) United States Patent
West et al.

(10) Patent No.: US 7,954,640 B2
(45) Date of Patent: *Jun. 7, 2011

(54) PAPER JAR PACKAGING WITH COATED WALLS

(76) Inventors: Ellery West, Crescent City, CA (US); Gail West, Crescent City, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/505,211

(22) Filed: Jul. 17, 2009

(65) Prior Publication Data

US 2010/0276476 A1 Nov. 4, 2010

Related U.S. Application Data

(63) Continuation-in-part of application No. 12/434,400, filed on May 1, 2009.

(51) Int. Cl.
*B65D 85/84* (2006.01)

(52) U.S. Cl. ...... 206/581; 206/385; 206/447; 206/524.1

(58) Field of Classification Search ................... 206/581, 206/210, 823, 447, 385, 813, 277, 524.1, 206/524.2, 524.3, 524.9, 524.6
See application file for complete search history.

(56) References Cited

U.S. PATENT DOCUMENTS

| | | | |
|---|---|---|---|
| 2,074,899 A | 3/1937 | Gazette | |
| 2,180,841 A | 11/1939 | Vogt | |
| 2,432,462 A | 12/1947 | Waters | |
| 3,337,114 A * | 8/1967 | Lockwood | ................... 229/5.84 |
| 3,800,977 A | 4/1974 | Stager et al. | |
| 3,933,297 A | 1/1976 | Carlsson | |
| 3,957,558 A | 5/1976 | Lee et al. | |
| 3,988,185 A | 10/1976 | Johnson et al. | |
| 4,974,966 A | 12/1990 | Fabbi | |
| 4,978,021 A * | 12/1990 | Mini et al. | ........................ 220/8 |
| 4,992,220 A | 2/1991 | Neri et al. | |
| 5,178,469 A | 1/1993 | Collinson | |
| 5,348,186 A | 9/1994 | Baker | |
| 5,516,562 A | 5/1996 | Edwards et al. | |
| 5,542,599 A | 8/1996 | Sobol | |
| 5,622,308 A | 4/1997 | Ito et al. | |
| 5,676,990 A * | 10/1997 | Wawrzynski | ................. 426/305 |
| 5,679,421 A | 10/1997 | Brinton | |
| 6,149,993 A * | 11/2000 | Parks et al. | ................... 428/34.2 |
| 6,360,944 B1 * | 3/2002 | Gorman | ........................ 229/400 |
| 6,802,938 B2 * | 10/2004 | Mohan et al. | ................. 162/135 |
| 6,814,253 B2 | 11/2004 | Wong | |
| 6,906,299 B2 * | 6/2005 | Watkins | ........................ 219/725 |
| 6,960,374 B1 | 11/2005 | Terada | |

(Continued)

FOREIGN PATENT DOCUMENTS

DE 4137802 A1 5/1993

(Continued)

*Primary Examiner* — Jacob K Ackun, Jr.
(74) *Attorney, Agent, or Firm* — Fish & Associates, PC

(57) ABSTRACT

A biodegradable jar has an enclosure wall with a cap that form a jar that holds a semi-solid material. In order to prevent the biodegradable wall from being weakened by the semi-solid material in the jar, both an exterior surface and an interior surface of the wall and the cap include a permeation barrier material that substantially prevents the semi-solid material from seeping through the walls of the jar. The enclosure wall could have an inner wall that is shorter than the outer wall which forms a ledge that a separate cover for the semi-solid material could rest upon.

16 Claims, 3 Drawing Sheets

U.S. PATENT DOCUMENTS

| | | |
|---|---|---|
| 7,048,975 B1 | 5/2006 | Tojo et al. |
| 7,344,784 B2 | 3/2008 | Hodson |
| 7,458,500 B2 | 12/2008 | Whitaker et al. |
| 2001/0054567 A1 | 12/2001 | Desmarais |
| 2005/0023184 A1* | 2/2005 | Ramet ........................ 206/581 |
| 2005/0130261 A1 | 6/2005 | Wils et al. |
| 2006/0226157 A1 | 10/2006 | Martin |
| 2007/0071365 A1 | 3/2007 | Stevens et al. |
| 2007/0110928 A1 | 5/2007 | Bried et al. |
| 2007/0295792 A1* | 12/2007 | Zammit et al. ................ 229/122 |
| 2008/0110920 A1 | 5/2008 | Hlista et al. |

FOREIGN PATENT DOCUMENTS

| | | |
|---|---|---|
| EP | 1035025 | 9/2000 |
| EP | 1035025 A1 | 9/2000 |
| WO | 2006082473 A2 | 8/2006 |

* cited by examiner

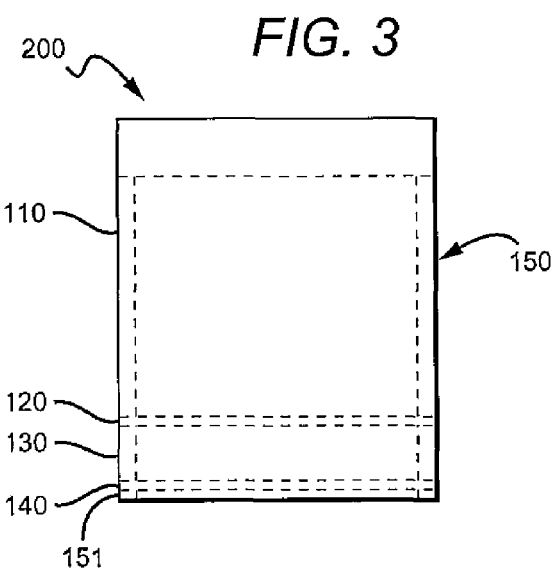
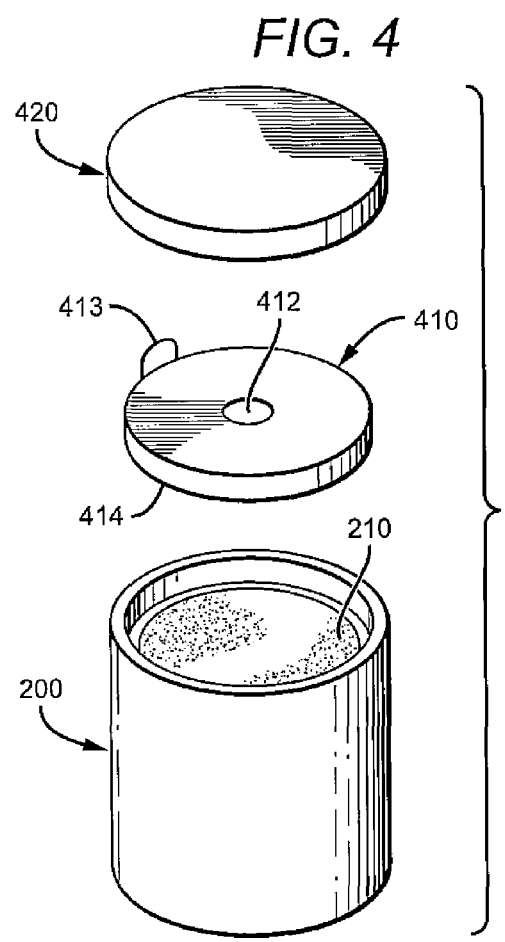
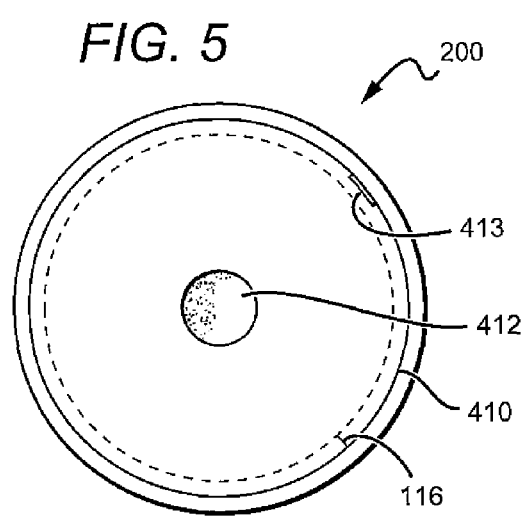

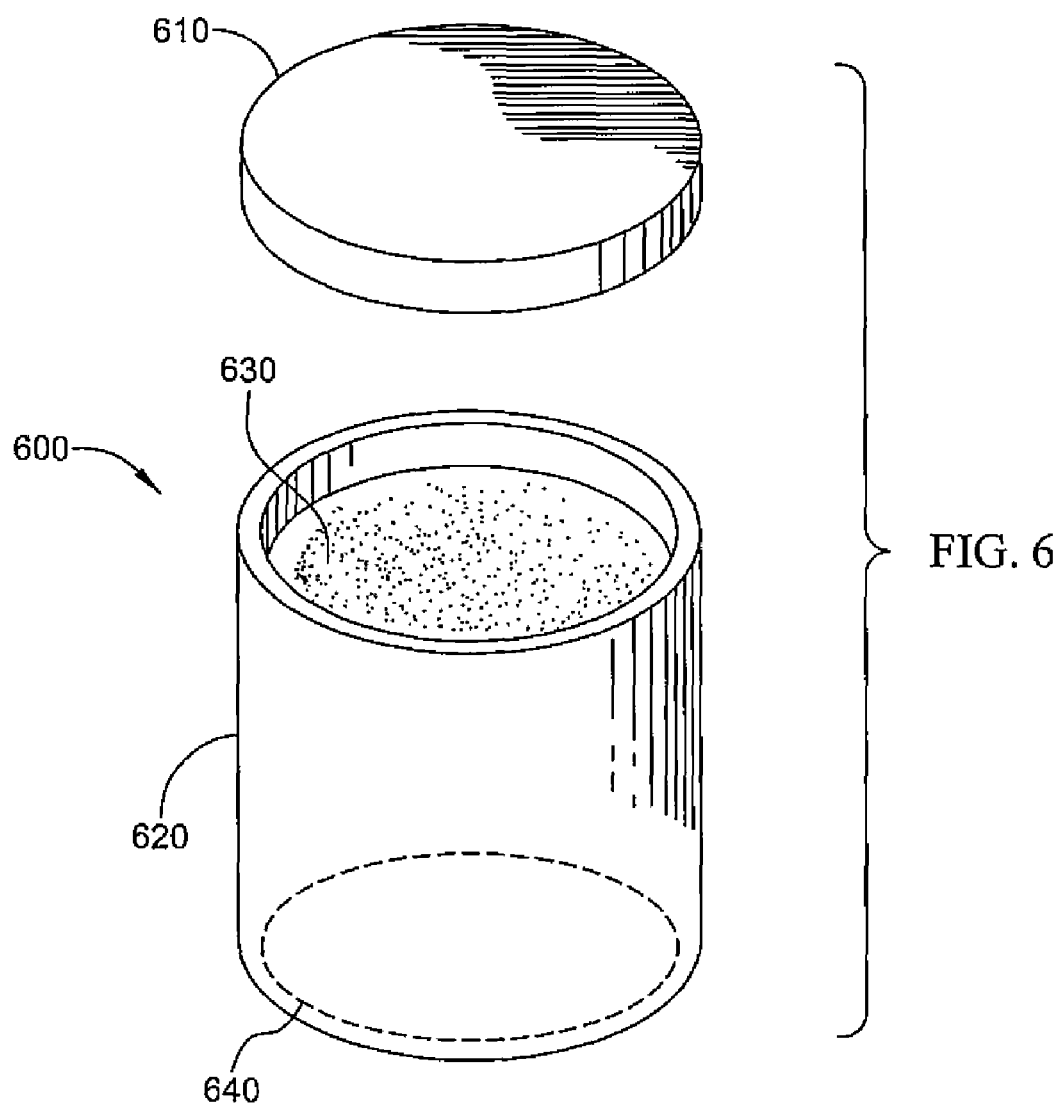

PAPER JAR PACKAGING WITH COATED WALLS

This application is a continuation-in-part of non-provisional application Ser. No. 12/434,400 filed May 1, 2009. All prior applications are incorporated by reference in their entirety.

FIELD OF THE INVENTION

The field of the invention is containers for semi-solid materials.

BACKGROUND

Americans currently produce more waste than any other nation in the world. Much of the waste comes from plastic and/or metal, which decomposes at a very slow rate. These materials must be recycled, dumped into the oceans or waterways, or deposited into landfills where they will remain for centuries.

In order to reduce the waste in our ever-filling landfills, it is advantageous to create containers that are biodegradable and/or compostable. U.S. Pat. No. 2,074,899 to Gazette teaches a container that is made entirely of paper, but that container is not entirely satisfactory. Gazette's paper container is neither air tight nor water tight, so that liquids or semi-solids stored in the container can spill or evaporate. In addition, even barring spilling or evaporation, Gazette's paper container can't hold liquids or semi-solid materials for an extended period of time since those materials would eventually saturate the paper container and leak out or dissolve parts of the container.

Gazette and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

EP1035025 to Lowry teaches a container having a body that is made substantially out of paper, but uses a thermoplastic cap to maintain a tight seal. Plastic caps, however, are not biodegradable and would still contribute to our landfill problems. Also, Lowry's container is similar to Gazette's container in that liquids or semi-solid materials would tend to saturate the container, and eventually leak out.

US2007/0110928 to Bried teaches a container with a wax coating on the inside of the container. However, wax coatings tend to dissolve in the presence of oil based contents, and in any event waxes are not necessarily biodegradable.

Thus, there is still a need for a sealed biodegradable container that holds liquids or semi-solid contents over a period of time.

SUMMARY OF THE INVENTION

The inventive subject matter provides apparatus, systems and methods in which a vessel has a fibrous outer wall (preferably a cardboard outer wall) with a lumen, and a fibrous inner wall disposed within the lumen of the outer wall. At least portions of the inner surfaces of each of the inner and outer walls include a permeation barrier material.

As used herein the term "vessel" means an object used as a container for solids, liquids and/or semi-solids. Semi-solids materials are both solid and liquid at room temperature. While semi-solids could be made of a single chemical composition where freezing point and the melting point are between 10 degrees Fahrenheit of room temperature, the semi-solid material is preferably a mix of solids and liquids.

As used herein "fibrous material" means materials characterized by a plurality of discrete fibers. The filaments can be plant or animal derived, synthetic, or some combination of these. In "plant-derived fibrous materials" the filaments are at least predominantly of plant origin, examples of which include wood, papyrus, rice, ficus, mulberry, fibers, cotton, yucca, sisal, bowstring hemp and New Zealand flax. Further, as used herein the term "fibrous wall" means a wall comprising a fibrous material as a significant structural constituent. The fibrous walls contemplated herein preferably have at least 2, 5, 10, 20 or even 30 dry weight percent of fibers. Preferably, the fibrous walls have at least 80 or 90 dry weight percent of fibers. Paper is generally a fibrous material that is usually made by pressing and de-watering moist fibers, typically cellulose pulp derived from wood rags, or grasses. Preferably, the fibrous material is rigid and is largely inflexible, as, for example, layered paper or corrugated cardboard. The structure of a fibrous material that is substantially rigid will tend to bend or break if a great deal of pressure is placed upon it, in contrast to a flexible material that will tend to flex and return back to its original shape after the pressure is released. Preferably, the walls, bottom, and cap are all rigid.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, a statement that a permeation barrier is "substantially impermeable" to oil and/or water means that a wall treated with that additive has a transfer rate of less than or equal to 50 µl of water and/or sunflower oil per $cm^2$ per six-month period of time at room temperature and normal atmospheric pressure (STP). Preferably, the permeation barrier material is substantially impermeable to both water and oil.

It is contemplated that permeation barriers could be applied to parts of the vessel prior to assembly, or even after assembly. In preferred embodiments, the walls comprise a rolled paper upon which an adhesive has been coated and/or impregnated. Such walls would typically include six to eight layers (wraps) of the paper/permeation barrier combination.

In a preferred embodiment, the permeation barrier comprises an adhesive, which term is used herein to mean any compound in a liquid or semi-liquid state used to adheres or bonds items together. Prior to use, adhesives can be pastes (very thick) or glues (relatively fluid). All suitable adhesives are contemplated, including for example Elmer's™ Glue (polyvinyl acetate), or in a very simple case a glue made from milk powder and vinegar. Other suitable permeation barrier materials include those disclosed in U.S. Pat. No. 7,344,784 to Hodson or US20050130261 to Wils.

The outer wall can be made of any suitable fibrous material, preferably biodegradable and preferably comprises paper, cardboard, or fiberboard. Wrapped materials seem to have the best strength and cost characteristics. The outer wall can advantageously define a lumen in which inner wall is disposed.

As used herein, a "biodegradable material" means a material that will break down to at least 90% $H_2O$, $CO_2$, and biomass within a period of six months from the action of naturally occurring micro-organisms such as bacteria, fungi, algae etc. under favorable conditions. For example, meat, plants, wood, cotton, polylactic acid polymers, and paper are all deemed herein to be biodegradable. In preferred embodiments, every element of the vessel, including the inner wall, the cap, the cover, the spacers, the bottoms, adhesives, and permeation barrier materials are biodegradable.

In preferred embodiments, the outer wall forms a cylinder, but could also be shaped to have polygonal, oval or other horizontal cross-sections. The outer wall could even form a cone, or be frustoconical, although from a manufacturing and distribution standpoint the horizontal cross-sections should be substantially the same from top to bottom. In an exemplary embodiment, the outer wall comprises a hollow cardboard tube. The outer wall could be any thickness, but is preferably within 1 mm to 10 mm thick.

The outer wall preferably has an open top and a closed bottom to form a cup. As used herein, the term "wall having an open top" means that the wall defines an opening that is ordinarily open during typical usage. Similarly, as used herein, the term "closed bottom" means that the wall defines a bottom that is ordinarily closed during typical usage. Under these definitions, an ordinary shampoo bottle is a vessel having a wall with an open top because the cap is either removed or disposed in an open position during typical usage. Also under these definitions, a Campbell's soup can with a pull tab top has a wall with an open top because the top is removed during typical usage. The bottom of such a soup can, however, is closed because the bottom is not removed during typical usage.

The outer wall and closed bottom could be made from a single piece of material, but preferably the closed bottom is a separate piece that fits within the lumen of the outer wall and sits on a movement restrictor formed by folding over a lower edge of the outer wall. The closed bottom could be flush with the bottom edge of the outer wall, but is more likely recessed from the bottom edge of the outer wall by at least 5, 10, 20, or 40 mm. In this instance, a commercially reasonable upper limit is thought to be about 30% of the height of the outer wall. Preferably, the closed bottom is located within 20, 10, 5, 3, or 2 mm from the bottom edge of the outer wall.

The movement restrictor can be coupled to the bottom of the outer wall in a variety of ways, including for example by gluing, using "teeth" or other detents, or by merely folding one or more edges of the outer wall inward to form a folded edge (i.e., "ledge") upon which the closed bottom rests. As used herein, a "movement restrictor" is a device that limits a travel of an object in at least one direction.

In another embodiment, the closed bottom could be a separate cap that is sized and dimensioned to fit over the bottom end of the outer wall to create a bottom of the vessel, and could be held in position by a tight fitting, but is preferably mechanically attached (for example by using screw threads and pins) or is attached using an adhesive. A separate cap could also be sized and dimensioned to fit within the bottom end of the outer wall's lumen, and could be mechanically attached or attached using an adhesive to create a flushed or a recessed bottom. In the second scenario, the separate cap preferably serves as a support for a false (or upper) interior bottom.

The inner wall can also be made of any suitable fibrous material, preferably biodegradable and preferably comprises paper, cardboard, or fiberboard. Typically, one would use the same material as used for the outer wall, although this is not a requirement. The inner wall is very likely shaped similarly to the outer wall, but with a smaller height and width, so as to be disposed snugly within the lumen defined by the outer wall. Alternatively, the inner wall could be much smaller than the lumen, or have a different shape of horizontal cross-section (e.g. round versus hexagonal), and could be kept in place with spacers. While the inner wall is preferably a separate piece that is attached, glued, or otherwise affixed to the interior surface of the outer wall, the inner wall could merely be an extension of the outer wall, for example a carved ledge within a single block of wood.

The interior cavity that houses the semi-solid or liquid product material is generally defined by (a) the inner surface of the inner wall and (b) either the closed bottom of the outer wall or a false bottom that is located between the closed bottom and the open top. The height of the false bottom is most readily set by a spacer that is placed in between the false bottom and the closed bottom. A taller spacer can be used to shrink the volume of the interior cavity, or to provide a hidden pocket in the bottom of the vessel.

A cover can be used to enclose or partially enclose the upper side of the interior cavity, and the product material being stored therein. Ideally, the cover is sized and dimensioned to rest upon the top edge of the inner wall, and also to extend across the inner surfaces of the outer wall. Such a design can advantageously provide a substantially air and moisture-tight seal, preventing much of the product material from evaporating. A small handle could also be coupled to the cover to allow a user to easily remove and replace the cover at any time.

The bottom of the interior cavity, the underside of the cover, and the top edge of the inner wall all preferably include the permeation barrier material in one way or another to prevent the product material from seeping through.

Preferred containers are jars. As used herein the term "jar" means a vessel that is (1) no more than 20 cm tall; (2) has a closed bottom end; and (3) a mouth that is at least 3 cm wide (i.e., internal diameter) and/or is 0.3 to 2.5 times the greatest height of the vessel. Jars are usually cylindrical, but can also have horizontal cross-sections that are polygonal, oval, etc.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 shows a cross-sectional view of the jar of FIG. 2.

FIG. 4 shows the jar of FIG. 2 with an optional cover and a cap.

FIG. 5 shows the top view of the jar of FIG. 4, with the cover installed.

FIG. 6 shows a single-walled jar in accordance with another embodiment.

DETAILED DESCRIPTION

Figures 1, 2:
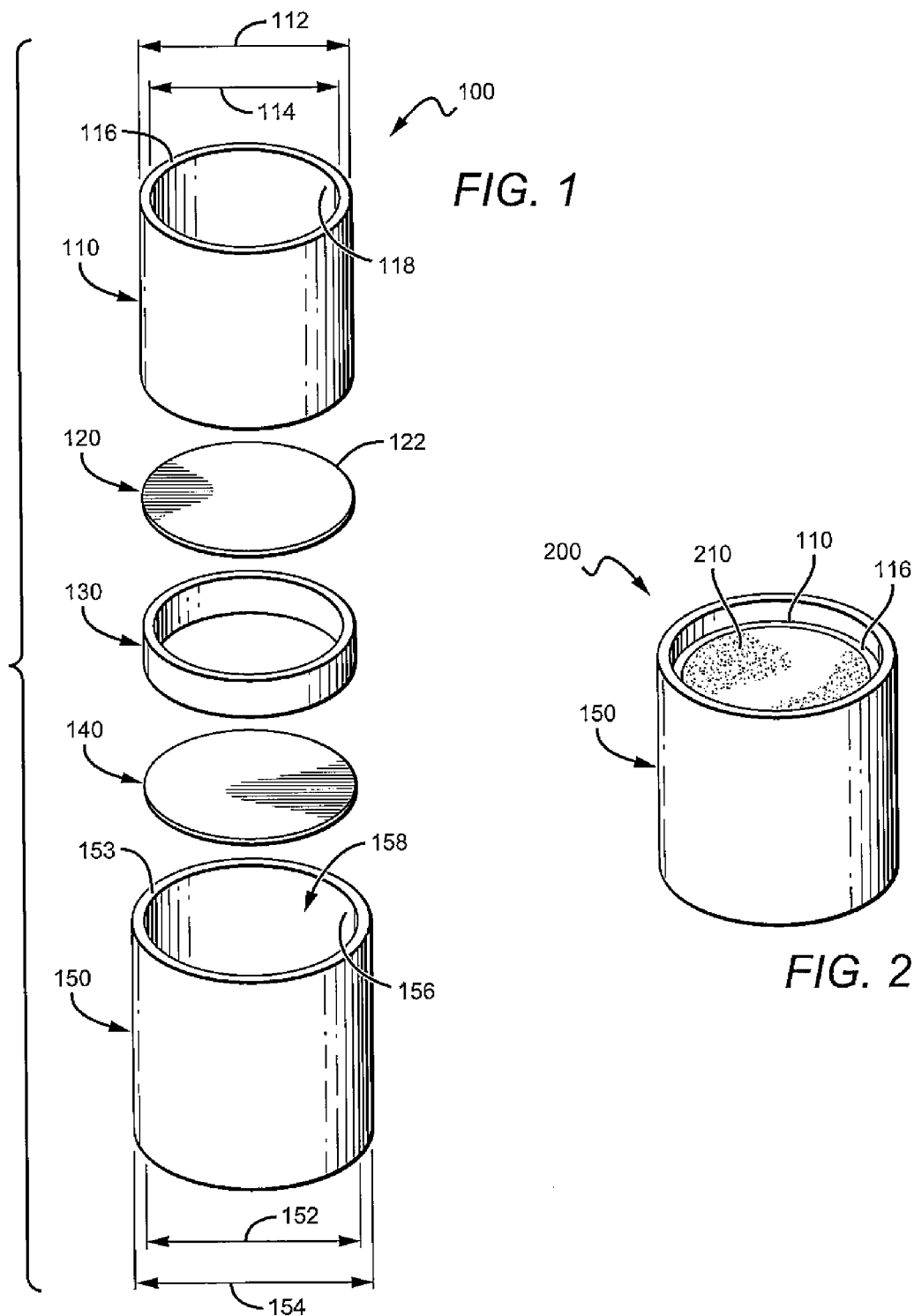
FIG. 1 is an exploded view of a double walled biodegradable jar according to one embodiment.
FIG. 2 is a perspective view of the jar of FIG. 1 assembled into a single jar.

FIG. 1 illustrates an embodiment of an inventive jar 100 comprising an inner wall 110, a first disc 120, a spacer 130, a second disc 140, and outer wall 150. The outer wall receives each of the second disc 140, the spacer 130, the first disc 120, and the inner wall 110 in lumen 158, respectively.

Outer wall 150 is a cylindrical hollow tube with inner diameter 152 approximately 7.1 cm, outer diameter 154 approximately 7.2 cm, and interior surface 156. Outer wall 150 is composed essentially of a structural material (preferably rolled 20-40 pound paper) and a permeation barrier material, and could readily be constructed with a standard cardboard tube machine. Other structural materials could additionally or alternatively be used, including for example other types of biodegradable, fibrous material. The structural material could also be molded as opposed to being rolled. An adhesive is the currently most preferred permeation barrier material, but all other suitable materials are contemplated, as for example an oil- or water-based varnish.

The permeation barrier material could be utilized in any suitable manner. For example, the inner sides of the outer wall could be sprayed or otherwise coated with the permeation barrier material, or it can be impregnated into the structural material. Additionally or alternatively, the permeation barrier material (especially as an adhesive) could be applied to the sides of a paper before or as the paper is being rolled.

Since the top edge 153 of outer wall 150 would likely encounter some of the product material during use, it is contemplated that the top edge 153 could have some permeation barrier material. As with the rest of the outer wall 150, the permeation barrier material could be impregnated into the structural material of the wall, or added as a coating.

Outer wall 150 has an inner diameter 152 that at least partially defines lumen 158. In FIG. 1, the inner diameter measures approximately 71 mm. The outer wall 150 has a thickness of about 1 mm, so that the outer diameter 154 of the outer wall 150 is approximately 74 mm. In other contemplated embodiments the inner and outer diameter thickness could be larger or smaller, and could have other suitable dimensions. Preferably, the outer wall 150 has a thickness of about at least 1 mm to provide adequate strength and durability.

As defined herein, an outer wall that "at least partially define a lumen" means that the inner lumen 158 could be wholly defined by the inner diameter of the outer wall, or could be defined by the inner diameter of the outer wall and another wall, for example the inner wall or an extension attached to the outer wall. In FIG. 1, the lumen is defined by both the inner diameter of the outer wall and the inner diameter of the inner wall. As defined herein, a "lumen" is a hollow cavity in the vessel. At least one portion of an interior wall of the lumen faces another part of the interior wall of the lumen without any intervening material in between the interior walls.

Second disc 140 is preferably a disc that fits snugly within lumen 158 and rests upon a movement restrictor 151 (see FIG. 3) that prevents second disc 140 from sliding out the bottom of outer wall 150. While second disc 140 is preferably a chipboard disc, although other biodegradable or fibrous materials could be used. Preferably, second disc 140 is a circle with a diameter substantially equal to inner diameter 152. As defined herein, a "substantially equal" length or diameter is one that is within a 1 mm tolerance. This prevents second disc 140 from sliding around and helps to provide a tight seal in case semi-solid material 210 (see FIG. 2) leaks through the first disc and onto the second disc. Second disc could also be covered or impregnated with, or could otherwise include a permeation barrier material if desired. For marketing purposes, a bottom surface of second disc can be colored, corrugated, or have some other aesthetic design.

Spacer 130 is a short cardboard tube that separates the first disc 120 from the second disc 140. Like second disc 140, first disc 120 is also preferably a chipboard disc, although other biodegradable or fibrous materials could be used. While spacer 130 is shown as a tube that fits snugly with the lumen, spacer 130 could be any suitable size and shape that helps restrict movement between first disc 120 and second disc 140. By placing a spacer in between first disc 120 and second disc 140, the false bottom allows jar 100 to appear as though it has more semi-solid material than it really does. This could be advantageous from a marketing standpoint, in at least three ways: (1) to compete with plastic walled jars that often contain dead space to make the product appear larger than it really is; (2) to provide a larger label; and (3) to provide a chamber for free prizes or coupons.

Both spacer 130 and first disc 120 could include permeation barrier material. First disc 120 should have at least its top surface and edges impregnated or otherwise covered with the permeation barrier material, since first disc 120 acts as the bottom to the interior cavity where the semi-solid material is held. The rim of first disc 120 can also be glued to the interior surface 156 to prevent any semi-solid material from leaking through spaces or cracks between them.

Inner wall 110 is also a cylindrical hollow tube with inner diameter 114, outer diameter 112, inner surface 118, and top edge 116. Inner wall 110, first disc 120 and cover 410 (see FIG. 4) define the interior cavity where the semi-solid or other product material is held. Preferably the inner wall is coupled to the outer wall using an adhesive, for example a sticky permeation barrier material.

The outer diameter 112 of inner wall 110 is configured to be juxtapose the inner diameter 152 of outer wall 150. While inner wall 110 is shaped to match the shape of outer wall 150, in alternative configurations (not shown) the inner wall could have any other suitable shape. Preferably, the difference between inner diameter 114 and outer diameter 112 (i.e., the thickness of inner wall 110) is at least 1 mm, but could also be at least 2 mm to allow for a larger "shelf" for a cover 410 (see FIG. 4) to rest upon.

In a manner similar to outer wall 150, inner wall 110 includes a permeation barrier, as a coating, impregnated material, or in some other manner is also covered with the permeation barrier material and, Preferably, permeation barrier material is also included on top edge 116 to prevent the wall material from saturating if a user scrapes semi-solid material over the top edge 116 of inner wall 110.

Some sort of glue preferably holds inner wall 110 against outer wall 150, although other suitable coupling means could be used to join the walls together, including affixing inner wall to first disc 120, or using a clamp. A spacer (not shown) could also be placed between inner wall 110 and outer wall 150 to provide a false side in much the same way spacer 130 provides a false bottom.

FIG. 2 shows an assembled jar 200. From above, only outer wall 150 and inner wall 110 are visible, since the semi-solid or other product material 210 obscures a user's view.

Contemplated semi-solid product materials include facial cream, lotion, ice cream, yogurt, marzipan, lip balm, soft chocolate, soft cheese, ketchup, mustard, mayonnaise, relish, lemongrass, putty, caulk, wood filler, mosquito repellant, fire starters, boat leak paste, rosin, polish, or margarine spread. Typically, semi-solid or other product material 210 is either water or oil based, and could sometimes be both. As used herein, "oil" means any hydrophobic material that is liquid at room temperature. This includes, for example, petroleum, vegetable oil, butter, peanut butter, grease, and liquid animal fat. Liquids or solids could also be used in jar 200 as a product material, for example water, candy, cigarettes, spices, powdered drinks, protein powder, pins, tacks, screws, nails, jewelry, and pharmaceuticals.

A cross-sectional view of the assembled jar 200 is shown in FIG. 3, where the inner wall 110, first disc 120, spacer 130, second disc 140, and movement restrictor 151 can be seen. In the current embodiment, movement restrictor 151 prevents second disc 140 from falling out the bottom of assembled jar 200. Movement restrictor 151 could, for example, be a glue or a projection from the outer wall 150. In the current embodiment, movement restrictor 151 is a rolled bottom edge of the outer wall 150 that projects inward towards the center of the tube.

FIG. 4 shows the assembled jar 200 with a cover 410 and a cap 420. Cover 410 is similar to first disc 120, but is much thicker and either has a hole 412 in the center or a tab 413 to be used in pulling up the cover 410. Hole 412 and tab 413 are shown as exemplary handles that could be used to remove cover 410 from the vessel, but other suitable handles are contemplated. Other removal means are also contemplated, including for example a threaded cap, a loop, or some other projection or recess. Cover 410 is shaped and dimensioned to have a diameter smaller than the inner diameter 152 of outer wall 150 but larger than the inner diameter 112 of inner wall 110. This allows cover 410 to rest upon top edge 116 of inner wall 110 and protect the semi-solid material 210 from evaporating or sublimating. While cover 410 is preferably circular, the cover could be shaped in any suitable manner. Preferably, the cover is sized and dimensioned to be just slightly larger than the lumen of the interior cavity of the inner wall so as to sit comfortably on top of the inner wall.

Since cover 410 directly abuts the top layer of semi-solid material 210, very little of the semi-solid or other product material is exposed to open air. This creates a substantially air-tight seal around semi-solid material 210 so that the semi-solid material does not leak out of the jar or otherwise evaporate. The shelf-life of a semi-solid material could be increased tenfold, twentyfold, fiftyfold, or even a hundredfold using such a technique. In a preferred embodiment, the interior sides and the exterior sides of the cover, bottom, and walls are coated with the permeation barrier material to provide an even better seal. In another embodiment, all sides of each of the inner wall, outer wall, cover, cap, bottom, false bottom, and spacers are coated with the permeation barrier material.

After a user uses the product material, the user could replace cover 410 to re-seal the remaining product, especially with gels, greases or lotions that need to remain moist after use. Such a seal would tend to be facilitated by product material that might tend to collect on the top of the inner wall 110. Alternatively, a user might choose to just throw away the cover 410.

As shown in FIG. 5, the thickness of top edge 116 is wide enough to allow cover 410 to rest upon top edge 116 without falling into the inner wall. In a preferred embodiment, the permeation barrier material is employed in a sufficiently effective manner such that water evaporates from within the product material at a rate of less than 5% every six months, and even more preferably less than 3% every six months. In one embodiment, an underside of cover 410 has a thin plastic membrane that creates a vacuum seal when the cover is placed over semi-solid material 210.

Cap 420 is a paper cap that is sized and dimensioned to cover the top section of jar 200, although other biodegradable materials are contemplated. While cap 420 could be threaded or could have an indent that matches a detent in jar 200, cap 420 preferably just sits more or less snugly atop top of jar 200. Cap could also have permeation material included on one or both sides to help prevent the semi-solid material from evaporating.

In FIG. 6, a single-walled jar 600 has a wall 620, a base 640, and a cap 610. Each of wall 620, base 640, and cap 610 are made of a biodegradable fibrous material, preferably paper, and has an exterior side and an interior side that include permeation barrier material. Including permeation barrier material in both the exterior surface and the interior surface of the walls and caps provides additional protection against the semi-solid material 630 evaporating or otherwise escaping an interior cavity of jar 600. In this embodiment, the lumen of the single wall acts as an interior cavity to hold the semi-solid material 630. The single-walled jar could otherwise be prepared similarly to jar 100. For example, the single-walled jar 600 could have a cover (not shown) and a false bottom (not shown) formulated in a manner similar to jar 100. Preferably, the single walled jar is substantially rigid.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A biodegradable jar for housing a semi-solid material, comprising:
    a rigid fibrous outer wall having an open top, a closed bottom, and at least partially defining a lumen;
    a fibrous inner wall disposed within the lumen of the outer wall, the inner wall at least partially defining an interior cavity for housing the semi-solid material, the inner wall comprising a rolled fibrous material having first and second layers;
    a spacer disposed within the lumen of the outer wall, and disposed between the closed bottom and the inner wall;
    an upper bottom disposed within the lumen of the outer wall, and disposed between the inner wall and the spacer;
    a permeation barrier material disposed between the first and second layers of the inner wall, such that the inner wall is substantially impermeable to oil or water; and
    a fibrous cap shaped to receive the open top.

2. The vessel of claim 1, further comprising a movement restrictor coupled to the outer wall.

3. The vessel of claim 2, wherein the movement restrictor comprises a folded edge of the outer wall.

4. The vessel of claim 1, wherein the outer wall, the inner wall, the cap, and the permeation barrier material are biodegradable.

5. The vessel of claim 1, at least portions of an exterior surface and an interior surface of the inner wall include the permeation barrier material.

6. The vessel of claim 1, further comprising a spacer disposed between the outer wall and the inner wall.

7. The vessel of claim 1, further comprising an adhesive that couples the outer wall to the inner wall.

8. The vessel of claim 7, wherein the adhesive comprises the permeation barrier material.

9. The vessel of claim 1, wherein the permeation barrier material is substantially impermeable to oil.

10. The vessel of claim 1, wherein the permeation barrier material is substantially impermeable to water.

11. The vessel of claim 1, further comprising a cover sized and dimensioned to enter the lumen of the outer wall and cover the semi-solid material.

12. The vessel of claim 11, wherein the cover has a surface that is substantially equal to a cross-section of the lumen.

13. The vessel of claim 11, wherein the cover is sized and dimensioned to be unable to enter the interior cavity of the inner wall.

14. The vessel of claim 11, further comprising a handle coupled to the cover.

15. The vessel of claim 11, wherein the cover includes the permeation barrier material.

16. The vessel of claim 1, wherein the outer wall has a greatest height of no more than 20 cm, and wherein the open top has an internal diameter that is 0.3 to 2.5 times the greatest height.

* * * * *